(12) United States Patent
Shimada (10) Patent No.: US 7,124,244 B2
(45) Date of Patent: Oct. 17, 2006

(54) STORAGE SYSTEM AND A METHOD OF SPEEDING UP WRITING DATA INTO THE STORAGE SYSTEM

(75) Inventor: Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 306 days.

(21) Appl. No.: 10/659,374

(22) Filed: Sep. 11, 2003

(65) Prior Publication Data
US 2005/0021907 A1 Jan. 27, 2005

(30) Foreign Application Priority Data
Jul. 24, 2003 (JP) ............................. 2003-200840

(51) Int. Cl.
*G06F 12/00* (2006.01)
(52) U.S. Cl. ..................... 711/113; 711/162; 711/119; 714/14
(58) Field of Classification Search ................ 711/113, 711/114, 119, 120, 148, 162, 161; 714/5, 714/6, 14
See application file for complete search history.

(56) References Cited

U.S. PATENT DOCUMENTS

| | | | | |
|---|---|---|---|---|
| 5,123,099 A | * | 6/1992 | Shibata et al. | 711/120 |
| 5,437,022 A | * | 7/1995 | Beardsley et al. | 714/6 |
| 5,568,633 A | * | 10/1996 | Boudou et al. | 711/141 |
| 5,680,571 A | * | 10/1997 | Bauman | 711/122 |
| 5,708,771 A | * | 1/1998 | Brant et al. | 714/22 |
| 5,720,028 A | * | 2/1998 | Matsumoto et al. | 714/9 |
| 5,724,501 A | * | 3/1998 | Dewey et al. | 714/9 |
| 6,104,571 A | * | 8/2000 | Kabasawa | 360/236.4 |
| 6,230,240 B1 | * | 5/2001 | Shrader et al. | 711/114 |
| 6,408,370 B1 | * | 6/2002 | Yamamoto et al. | 711/167 |

(Continued)

FOREIGN PATENT DOCUMENTS

JP 9-146842 6/1997

(Continued)

OTHER PUBLICATIONS

IBM TotalStorage Enterprise Storage Server Model 800, Oct. 2002, IBM Redbooks, SG24-6424-01, pp. 30, 50-51, 88-89, 101.*

*Primary Examiner*—Matthew Kim
*Assistant Examiner*—Ryan A. Dare
(74) *Attorney, Agent, or Firm*—Mattingly, Stanger, Malur & Brundidge, P.C.

(57) ABSTRACT

A storage system having disk drives, a first and a second cache memory for temporarily storing data sent from a host system so as to be written in the disk drives and a duplicate of the data, a first FIFO buffer for temporality storing the duplicate data in order to transfer the duplicate data from the first cache memory to the second cache memory, and a second FIFO buffer for temporality storing the duplicate data in order to transfer the duplicate data from the second cache memory to the first cache memory. In the case where the data sent from the host system so as to be written in the disk drives are temporarily stored in the first cache memory and the duplicate of the data is stored in the second cache memory, completions of the data writing are reported to the host system at the time point when the data and the duplicate data are stored in the fist cache memory and the second cache memory. After the report of completions of data writing to the host system, the duplicate data stored in the FIFO buffer are stored in the cache memory.

12 Claims, 8 Drawing Sheets

U.S. PATENT DOCUMENTS

| | | |
|---|---|---|
| 6,438,647 B1 | 8/2002 | Nielson et al. |
| 6,567,889 B1 * | 5/2003 | DeKoning et al. .......... 711/114 |
| 6,574,709 B1 * | 6/2003 | Skazinski et al. ........... 711/119 |
| 6,681,339 B1 | 1/2004 | McKean et al. |
| 6,944,684 B1 * | 9/2005 | Kinjo et al. .................. 710/31 |
| 2003/0005355 A1 * | 1/2003 | Yanai et al. .................... 714/7 |
| 2004/0010658 A1 | 1/2004 | Inoue |
| 2004/0153727 A1 | 8/2004 | Hicken et al. |

FOREIGN PATENT DOCUMENTS

| | | |
|---|---|---|
| JP | 2001-318766 | 11/2001 |

* cited by examiner

STORAGE SYSTEM AND A METHOD OF SPEEDING UP WRITING DATA INTO THE STORAGE SYSTEM

BACKGROUND OF THE INVENTION

The present invention relates to a storage system having a plurality of storage devices such as disk drives and, particularly, to a control technique for speeding up writing data sent from a host system such as a computer.

In a typical storage system having a plurality of storage devices, high speed data reading and data writing have heretofore been achieved by temporarily storing data sent and received between a host system and the storage devices in a cache memory such as a semiconductor memory. For example, in the case of writing data sent from the host system, the storage system temporarily stores the data in the cache memory and, at this time point, informs the host system about a completion of the data writing. After that, the storage system actually writes the data stored in the cache memory in the storage devices independently of operation of the host system.

In the case where a speed of sending and receiving data in the storage system is increased by the use of the cache memory as described above, the storage system informs the host system about the completion of data writing when the data is temporarily written in the cache memory though the data has not been written in the storage devices. Therefore, if the data in the cache memory are lost before the data are written in the storage devices due to a failure in the cache memory or the like, it is unable to recover the data. In view of this problem, JP-A-2001-318766 and JP-A-9-146842 disclose a technique of duplicating a cache memory (or a control unit including the cache memory) of a storage system and writing data in both of the cache memories for the purposes of reducing probability of the data loss and improving reliability of the storage system.

Also, a technique of preventing the data loss by the use of a nonvolatile cache memory or a more redundant nonvolatile cache memory is disclosed on pages 88 to 89 in IBM Total Storage Enterprise Storage Server Model 800 (IBM Redbooks, SG24-6424-01, Second Edition (October 2002), IBM Corp., ISBN 0738428256).

SUMMARY OF THE INVENTION

The storage systems disclosed in JP-A-2001-318766 and JP-A-9-146842 has limitation in reducing response time because of the time consuming process of writing data in the duplex cache memory and then reporting the host system about the completion of writing. More specifically, since one of the control units serving to perform data transfer between the host system and the storage system transfers data to the cache memory of the other control unit and receives the report about completion of the data writing in the other control unit, it is necessary for the duplex control unit to communicate with each other, and such communication is a main factor of prolonging the time required for the storage system to responsed to the host system. In general, in the duplex system, one system and the other system are made independent from each other by using separate power units or the like in order to avoid mutual influence which otherwise occurs in case of failure. Accordingly, the communication between one system and the other system is time consuming, and it is difficult to speeding up the communication.

In IBM Total Storage Enterprise Storage Server Model 800, since the nonvolatile memory is provided in one of the control units as a backup memory for a cache memory, the above problem, i.e., the delay due to the data transfer between the duplex system does not occur. However, in the case where a battery is used as a power unit for the nonvolatile memory, it is generally impossible to enlarge the size of storage capacity of the nonvolatile memory to be that of the cache memory because capacity of the battery must also be enlarged when enlarging the nonvolatile memory capacity.

Therefore, it is necessary to limit the quantity of the data to be written in the cache memory to that storable in the nonvolatile memory. Thus, it is still difficult to sufficiently enhance data writing performance of the storage system from the standpoint of the host system. That is to say, when the quantity of data to be written exceeds that storable in the nonvolatile memory, the storage system cannot accept data subsequently sent from the host system until the data written in the cache memory is written in the storage devices, thereby resulting in largely deteriorated performance.

An object of the present invention is to speed up writing data sent from a host system in a storage system when the storage system has duplex cache memory for the purpose of improving its reliability.

In order to solve the above problems, one embodiment of the storage system of the present invention has the following constitution. The storage system has a plurality of control units and storage devices. Each of the control units has a first memory and a second memory. The second memory can be a FIFO buffer having capacity less than that of the first memory. In the above constitution, one of the control units of the storage system that has received a request for writing data from a host system stores data corresponding to the writing request in the first memory and the second memory. At this time point, the host system is informed about a completion of the data writing. After that, the control unit transfers the data stored in the second memory to the first memory of the other control unit.

Further, the storage system has a plurality of power units for independently feeding power to the control units. The second memory of each of the control units is fed power by a power unit other than the power units feeding power to the control unit having the second memory.

Alternatively, the second memory may have a battery in addition to be fed by the power unit that feeds power to the control unit, so that the power source is switched to the battery in the case where the power from the power unit is interrupted.

Further, in order to connect the plurality of control units and the host system, the storage system may have switches and interface units.

DESCRIPTION OF THE PREFERRED EMBODIMENTS

Embodiments of the present invention will hereinafter be described with reference to the accompanying drawings.

Figure 1A:
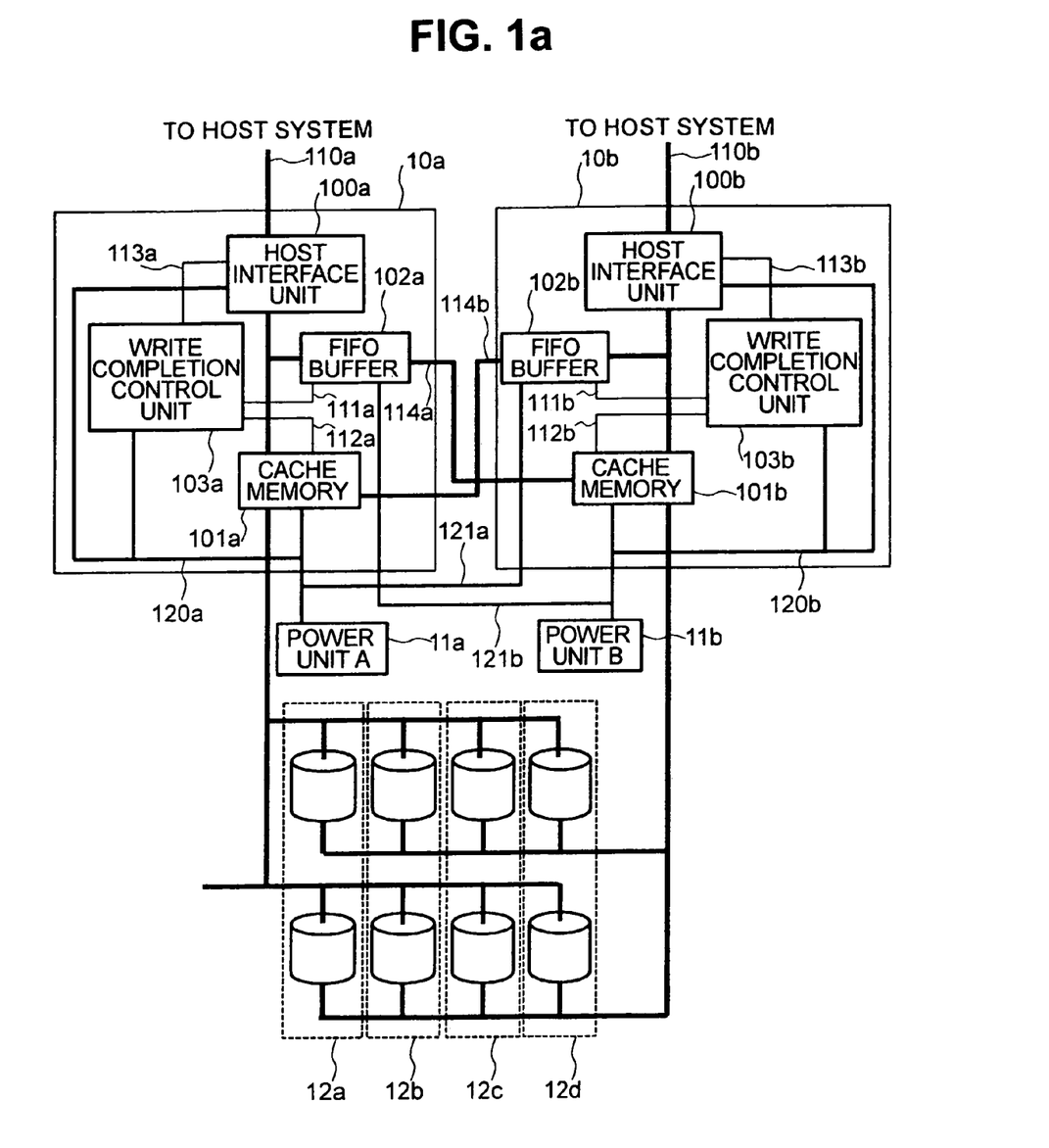
FIG. 1a shows a first example of embodiments of a storage system.

FIG. 1a is a diagram showing a first embodiment of a storage system to which the present invention is applied. The storage system has two control units (hereinafter referred to as controllers) 10, two power units 11, and a plurality of storage devices (hereinafter referred to as disk drives) 12. As used herein, the disk drives 12 are devices obtainable by using a storage such as a hard disk and an optical disk. Each of the disk drives 12 is connected to both of the controllers 10. The power units 11a and 11b are independent from each other, wherein the power unit 11a feeds power to the controller 10a and the power unit 11b feeds power to the controller 10b. Thus, if one of the power units 11 is at fault, the storage system can continue its operation by feeding power to the controllers 10 by the use of the other one of the power units 11.

Each of the controllers 10 has a host interface unit 100, a FIFO buffer 102, a write completion control unit 103, and a cache memory 101. Further, the host interface unit and the write completion control unit may be realized by the combination of a processor and software or by dedicated hardware.

The storage system of this embodiment has a structure of duplex system. The cache memories 101 are volatile storages used for temporarily storing data sent and received between the disk drives 12 and a host system.

The host interface unit 100a, the cache memory 101a, and the write completion control unit 103a of the controller 10a are connected to the power unit 11a via a power line 120a. In turn, the host interface unit 100b, the cache memory 101b, and the write completion control unit 103b of the controller 10b are connected to the power unit 11b via a power line 120b.

The FIFO buffer 102a of the controller 10a is connected to the power unit 11b via a power line 121b. The FIFO buffer 102b of the controller 10b is connected to the power unit 11a via a power line 121a. By the above-described power line connection, the FIFO buffer 102a of the controller 10a is connected to the independent power unit different from that of other components of the controller 10a, thereby establishing the duplex system of the FIFO buffer 102a and the cache memory 101a of the controller 10a. Accordingly, if one of the power units 11 is at fault, the components (cache memories 101 or FIFO buffers 102) receiving the power feeding from the other one of the power units 11 can retain data. In the same manner, the duplex system of the FIFO buffer 102b of the controller 10b and the cache memory 101b of the controller 10b is established.

Hereinafter, a data writing process in the storage system of FIG. 1a will be described briefly. For example, when data sent from the host system connected to the controller 10a are to be written into the storage system, the data is received first by the host interface unit 100a. Note that the similar processing is performed when the data is received by the controller 10b, too.

The data received by the host interface unit 100a are then sent to the FIFO buffer 102a and the cache memory 101a via a signal line 110a to be written therein. When the data writing is completed in the FIFO buffer 102a without any failure, the FIFO buffer 102a informs the write completion control unit 103a about the completion of data writing via a signal line 111a.

When the data writing is completed in the cache memory 101a without any failure, the cache memory 101a informs the write completion control unit 103a about the completion of data writing via a signal line 112a. Upon receipt of the information about the completions of data writing via the signal line 111a and the signal line 112a, the write completion control unit 103a informs the host interface unit 100a about the completions of data writing via a signal line 113a. Upon receipt of the information, the host interface unit 100a informs the host system about the completions of data writing. Here, since no communication is conducted between the controller 10a and the controller 10b, it is possible to speed up the data writing process in the storage system from the standpoint of the host system.

The data stored in the FIFO buffer 102a is transferred to and written in the cache memory 101b of the controller 10b via a signal line 114a after the host interface unit 100a has informed the host system about the completions of data writing. Thus, the communication relating to the data transfer is conducted between the controller 10a and the controller 10b after the completions of data writing are reported to the host system. Further, since the data stored in the FIFO buffer 102a are transferred to the cache memory 101b, it is possible to clear the FIFO buffer 102a for writing data subsequently sent from the host system. Accordingly, because a situation wherein the data sent subsequent from the host system have not been written in the storage system until the data are written in the disk drives 12 due to a lack of capacity in the FIFO buffer 102a does not occur, it is possible to further enhance performance of the data writing process.

Figure 2:
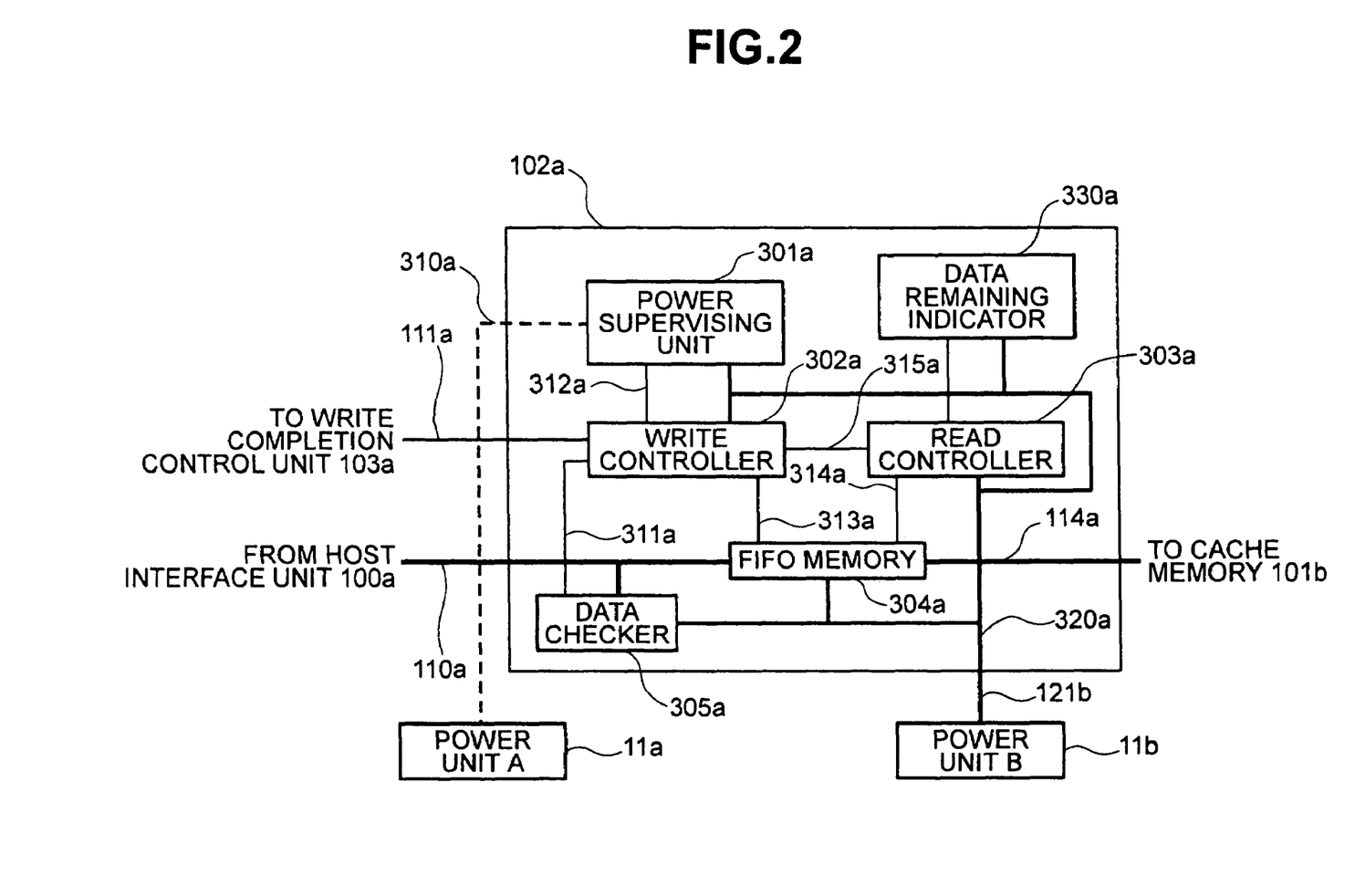
FIG. 2 shows one configuration example of a FIFO buffer used in the storage system.

FIG. 2 is a diagram showing one configuration example of the FIFO buffer 102a. The FIFO buffer 102b has the same configuration as that of the FIFO buffer 102a except that the power units 11a and 11b are exchanged. The FIFO buffer 102a is a memory having a power supervising unit 301a, a write controller 302a, a read controller 303a, a FIFO memory 304a, a data checker 305a, and a data remaining indicator 330a.

By the use of a CRC (cyclic redundancy check) or the like, the data checker 305a checks whether or not the data sent from the host system are erroneous due to failure that might have occurred during the transfer. When the data checker 305a confirms that there is no error, the result is sent to the write controller 302a via a signal line 311a. Upon receipt of the result from the data checker 305a, the write controller 302a outputs a write signal via a signal line 313a. Upon receipt of the write signal, the FIFO memory 304a stores the data transferred from the host system.

Upon completion of the data writing, the FIFO memory 304a informs the write controller 302a about the completion of data writing via the signal line 313a. Upon receipt of the completion of data writing, the write controller 302a informs the write completion control unit 103a about the completion of data writing via the signal line 111a. The write controller 302a also informs the read controller 303a about the completion of data writing in the FIFO memory 304a via a signal line 315a.

After being informed about the data writing in the FIFO memory 304a via the signal line 315a, the read controller 303a outputs a read signal via a signal line 314a. Upon receipt of the read signal, the FIFO memory 304a outputs the stored data to the signal line 114a, so that the data is transferred to the cache memory 101b of the controller 10b.

The power supervising unit 301a supervises states of the power unit 11a using a supervising signal line 310a (not shown in FIG. 1). The reason for the supervision of the power unit 11a is as follows. Since the signal from the host interface unit 100a is lost in the case where a failure of the power unit 11a occurs to result in a stoppage of power feeding, the FIFO buffer 102a can detect the failure in the power unit 11a only from presence or absence of the signal from the host interface unit 100a. However, if the power unit 11a feeds an erroneous voltage which is not a correct voltage, it is expected that the signal from the host interface unit 100a is not simply lost but causes erroneous operation that leads to generation of an abnormal signal. In this case, supervision of the signal from the host interface unit 110a is not sufficient for detecting such abnormal signal. Therefore, the power supervising unit 301a directly supervises the power unit 11a in order to judge whether or not the signal from the host interface unit 100a is expected to be normal.

If a failure occurs in the power unit 11a to bring about a state wherein data are not sent from the host interface unit 10a normally, the power supervising unit 301a outputs a write inhibition signal via a signal line 312a to the write controller 302a so as to inhibit the erroneous data from being stored in the FIFO memory 304a. Even if a failure occurs in the power unit 11a, components included in the FIFO buffer 102a can continue their operation without any failure since they are connected to the power unit 11b via a power line 320a and the power line 121b.

The FIFO buffer 102a is provided also with a data remaining indicator 330a for displaying whether or not data that have not been transferred to the cache memory 101b of the controller 10b remain in the FIFO memory 304a. In the case where a failure occurs in the controller 10a and the failure is to be restored by exchanging the controller 10a with a new one, a user or a manager of the storage system confirms whether or not the data transfer to the cache memory 101b of the controller 10b has been completed owing to the data remaining indicator 330a and then restores the failure by exchanging the controllers 10a after completion of the data transfer.

Figure 1B:
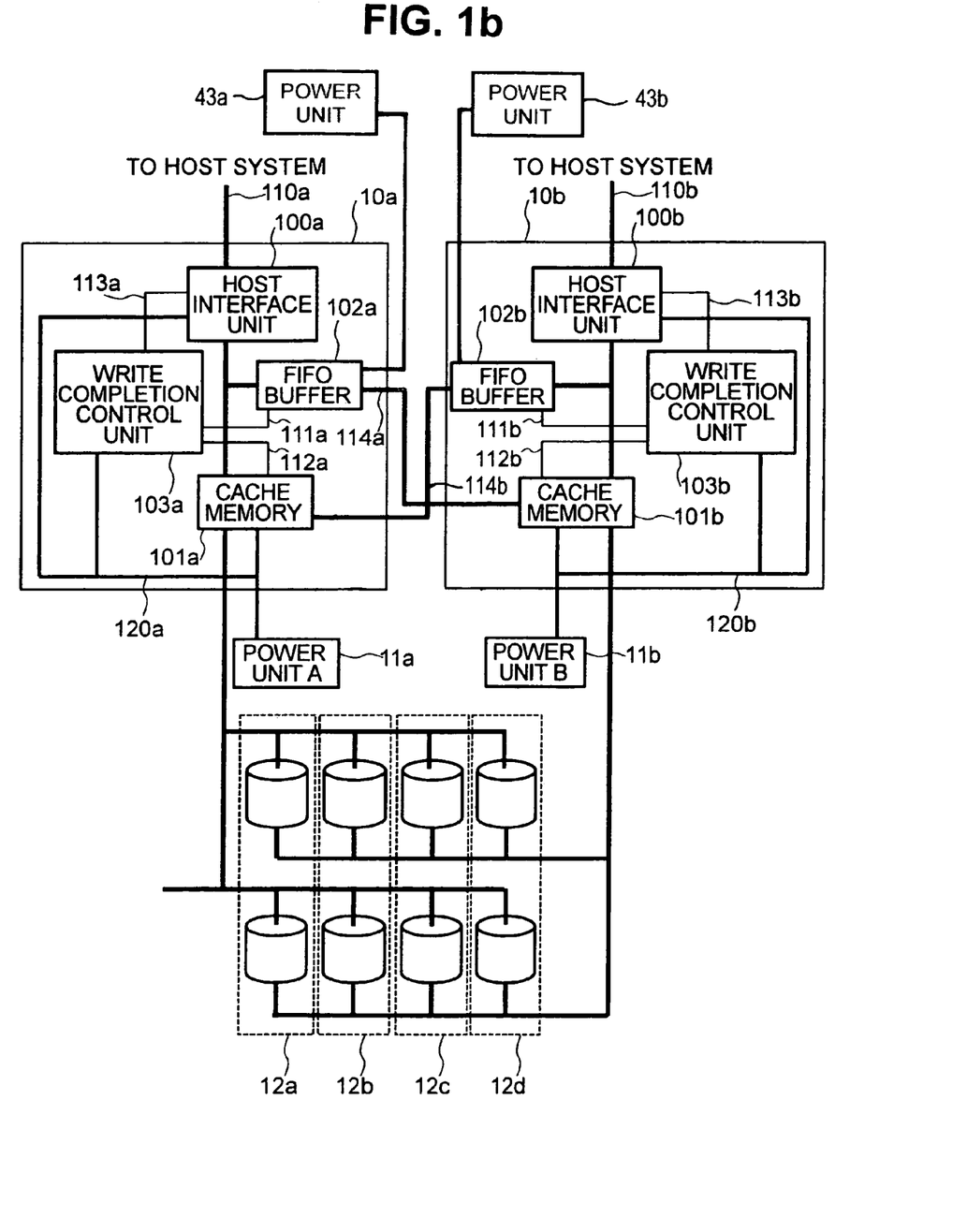
FIG. 1b shows an example of a second embodiment of a storage system.

A storage system of the present invention may have the following second embodiment, which has power units 43a and 43b in addition to the constitution of the first embodiment. In the storage system illustrated in FIG. 1b, FIFO buffer 102b is connected to the power unit 43b and FIFO buffer 102a is connected to the power unit 43a. With the constitution of the second embodiment, the power units 43a and 43b serve only to feed power respectively to the FIFO buffers 102a and 102b; therefore, it is possible to reduce capacities of the power units as compared with those of the power units 11a and 11b.

Figure 3:
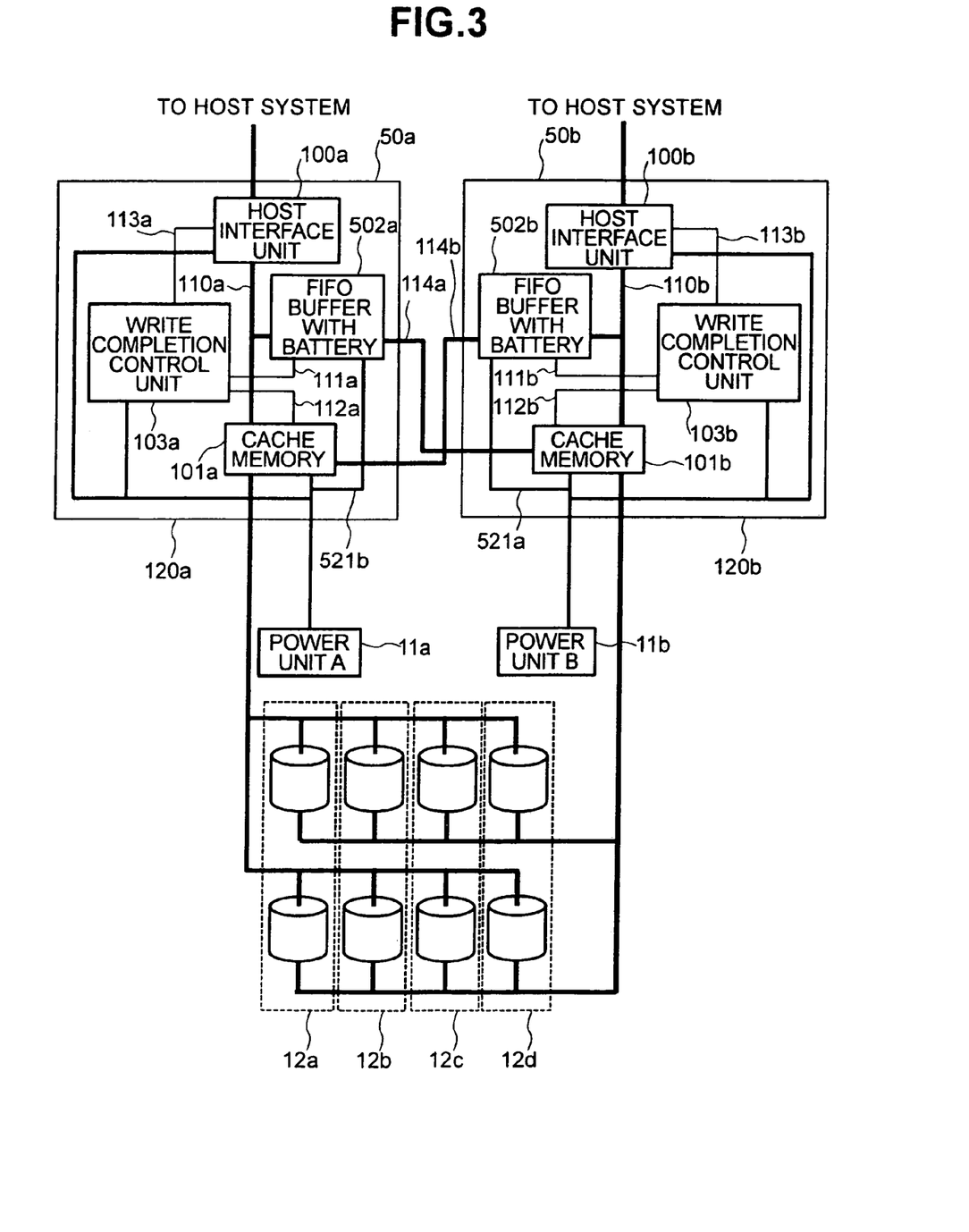
FIG. 3 shows a third example of the embodiments of the storage system according to the present invention.

FIG. 3 is a diagram showing a third embodiment of a storage system to which the present invention is applied. The storage system of the third embodiment is different from the first embodiment in that it has FIFO buffers 502a and 502b each of which includes a battery. Further, unlike the first embodiment, the FIFO buffer with battery 502a is connected to a power unit 11a via a power line 521b, and the FIFO buffer with battery 502b is connected to a power unit 11b via a power line 521a in this embodiment. The FIFO buffers with batteries 502a and 502b continue their operation by the use of the internal batteries in case of failures of the power units 11a and 11b. Other components and operation thereof are the same as those of the first embodiment.

Figure 4:
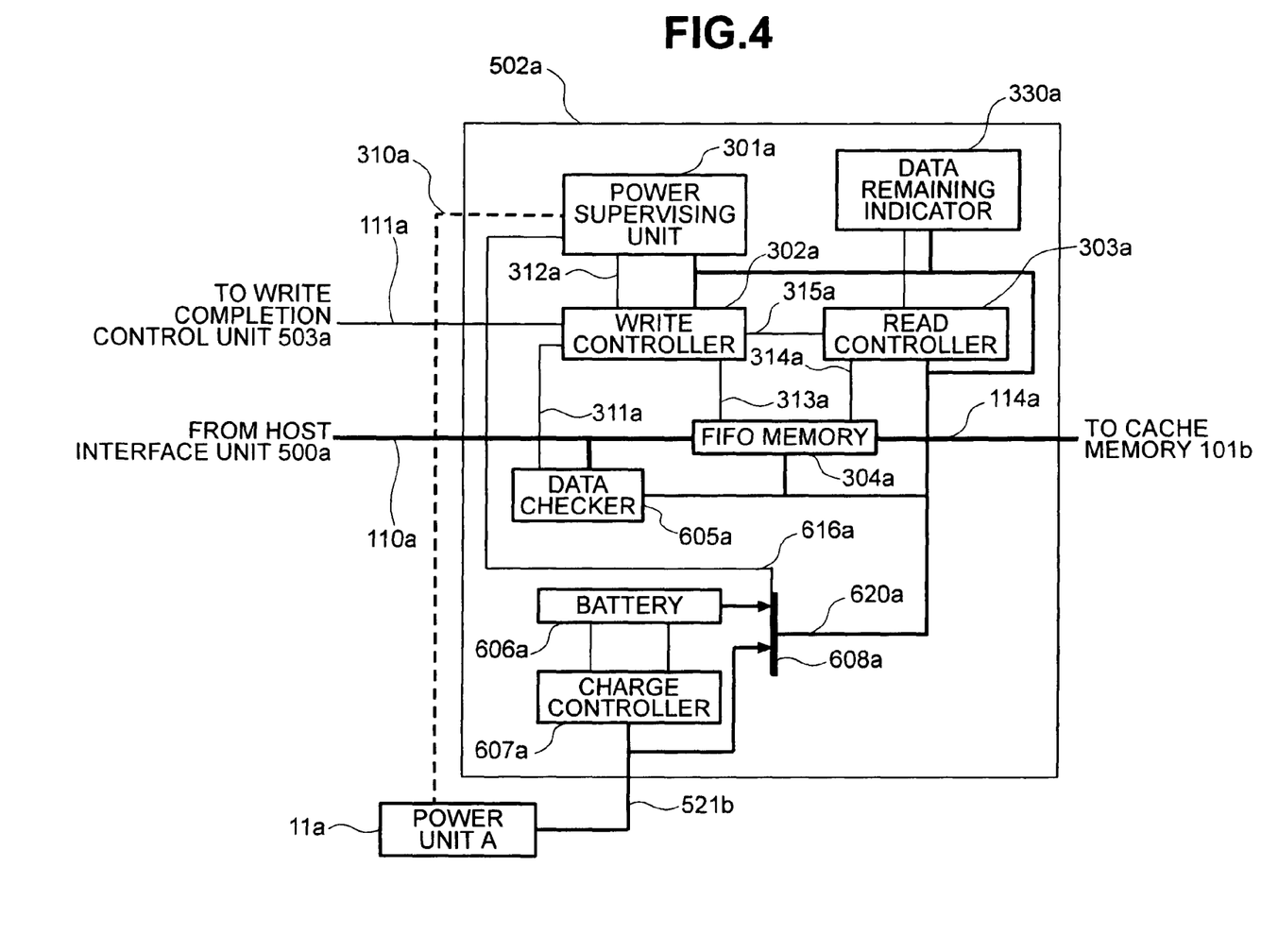
FIG. 4 shows one configuration example of a FIFO buffer with a battery used in the storage system.

FIG. 4 is a diagram showing one configuration example of the FIFO buffer with battery 502a. Configuration of the FIFO buffer with battery 502b is substantially the same as that of the FIFO buffer with battery 502a except that the power unit 11b is used in place of the power unit 11a. The FIFO buffer with battery 502a has a power supervising unit 301a, a write controller 302a, a read controller 303a, a FIFO memory 304a, a data checker 605a, a data remaining indicator 330a, a battery 606a, a charge controller 607a, and a power selector 608a.

The power supervising unit 301a supervises states of the power unit 11a by the use of a supervising signal line 310a (not shown in FIG. 3). Upon detection of a failure in the power unit 11a via the supervising signal line 301a, the power supervising unit 310a outputs a write inhibition signal to the write controller 302a via a signal line 312a in the same manner as in the first embodiment, so that new data are inhibited from being stored in the FIFO memory 304a. Also, in this embodiment, the power supervising unit 301a outputs a power unit switch signal to the power selector 608a via a signal line 616a simultaneously with the output of the write inhibition signal. Upon receipt of the power switch signal, the power selector 608a switches the power unit to be connected to a power line 620a connected to all the components from the power unit 11a to the battery 606a.

The battery 606a is charged by the charge controller 607a as long as the power unit 11a is in a normal state. Thus, the battery 606a is always ready to feed power to all the components in place of the power unit 11a. When the power switch signal is output from the power supervising unit 301a, the battery 606a feeds power to all the components of the FIFO buffer 502a via the power line 620a. Required duration of the power feeding from the battery 606a is from the time point when the power is switched from the power unit 11a to the battery 606a until all the data stored in the FIFO memory 304a are transferred to the cache memory 101b of the controller 50b. The duration is sufficient since no new data are stored in the FIFO memory after the power is switched to the battery 606a due to the write inhibition signal output from the power supervising unit 301a. Thus, the battery 606a does not have to be of large capacity, and a battery having small capacity is sufficiently used as the battery 606a.

Operation of the FIFO buffer with battery 502a other than that describe above is the same as the FIFO buffer of the first embodiment.

Figure 5:
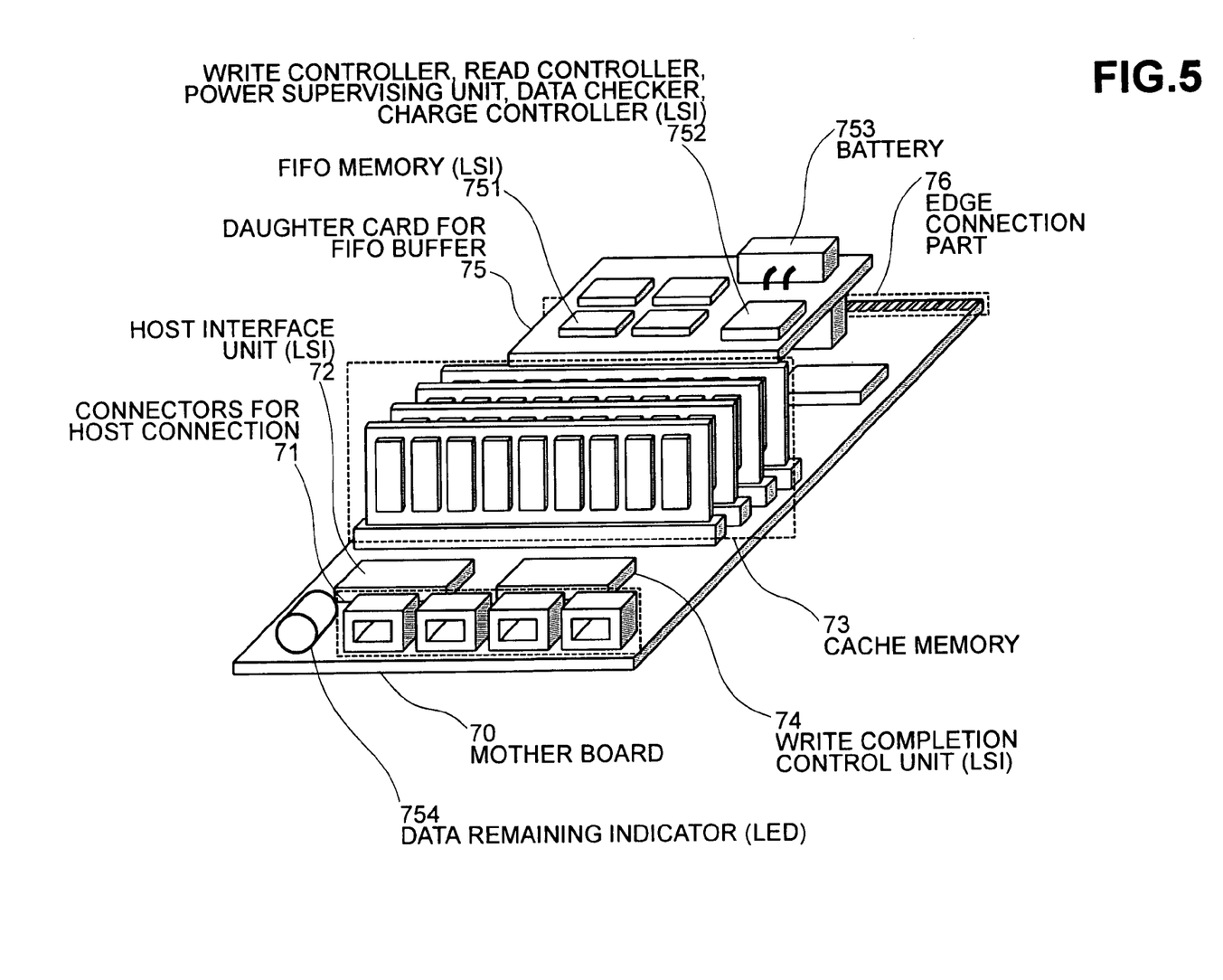
FIG. 5 shows one example of an appearance of a mother board of a controller used in the storage system.

FIG. 5 is a diagram showing a specific example of installation of the controllers 50 shown in FIG. 3. Mounted on a mother board 70 are connectors for host connection 71 connected to signal lines from a host system, an LSI 72 serving as a host interface unit, an LSI 74 serving as a write completion control unit, a cache memory 73 in the form of a DIMM (Dual In-line Memory Module), and a daughter card for FIFO buffer 75. Further, mounted on the daughter card for FIFO buffer 75 are an LSI 751 serving as a FIFO memory, an LSI 752 including a write controller, a read controller, a power supervising unit, a data checker, and a charge controller, and a battery 753.

The mother board 70 is connected to the other one of the controllers 50, disk drives 12, and the power units 11a and 11b via an edge connecting part 76. This means that power is fed to the components on the mother board 70 from the power unit 11a or the power unit 11b. Power is fed to the components on the daughter card for FIFO buffer 75 from the power unit 11a, the power unit 11b or the battery 753.

Referring to FIG. 5, a data remaining indicator 754 is mounted on the mother board 70 near a card edge at the side of the connectors for host connection 71 in the form of an LED. With such constitution, it is possible to observe the card edge at the side of the connectors for host connection 71 on the mother board 70 from outside when the controllers 50 are incorporated in the storage system. Thus, it is possible for the user or the manager of the storage system to observe the card edge from outside thereby to readily detect whether or not each of the controllers 50 is replaceable in case of failure.

Further, because the data remaining indicator 754 is mounted on the mother board 70, not on the daughter card for FIFO buffer 75, the data remaining indicator 754 and the daughter card for FIFO buffer 75 are connected so that power is fed to the data remaining indicator 754 via the signal line from the daughter card for FIFO buffer 75 when the power feeding from the power units 11 is stopped.

In the case where the remaining data indicator 754 is an LED, for example, the LED is adapted to emit light for indicating that each of the controllers 50 is replaceable and to be unlit for indicating that the controller 50 is not replaceable in order to prevent the LED from erroneously indicating that there is no remaining data and the controller 50 is replaceable though there is in fact data remaining in the FIFO memory. If the above indications are reversed, it is impossible for the user or the manager to distinguish the unlit state of the remaining data indicator 754 caused by disconnection of the signal line from the daughter card for FIFO buffer 75 due to some failure on the mother board 70 from the unlit state indicating that the controller 50 is replaceable.

However, it is possible to distinguish the unlit state caused by some failure on the mother board 70 from the unlit state indicating that the controller 50 is replaceable by the use of other means. For example, the maximum time required for transferring all the data from the FIFO memory to a cache memory of the other one of the controllers 50 may be measured in advance, so that an unlit state of the data remaining indicator 754 lasting over the maximum time can be recognized as that caused by some failure on the mother board 70.

Alternatively, in the case where it is possible to detect the data which have been sent last from the host system in the host system, the distinction may be attained by detecting in the other controller 50 whether or not the written data are stored in the cache memory or the disk drives of the other controller 50.

Figure 6:
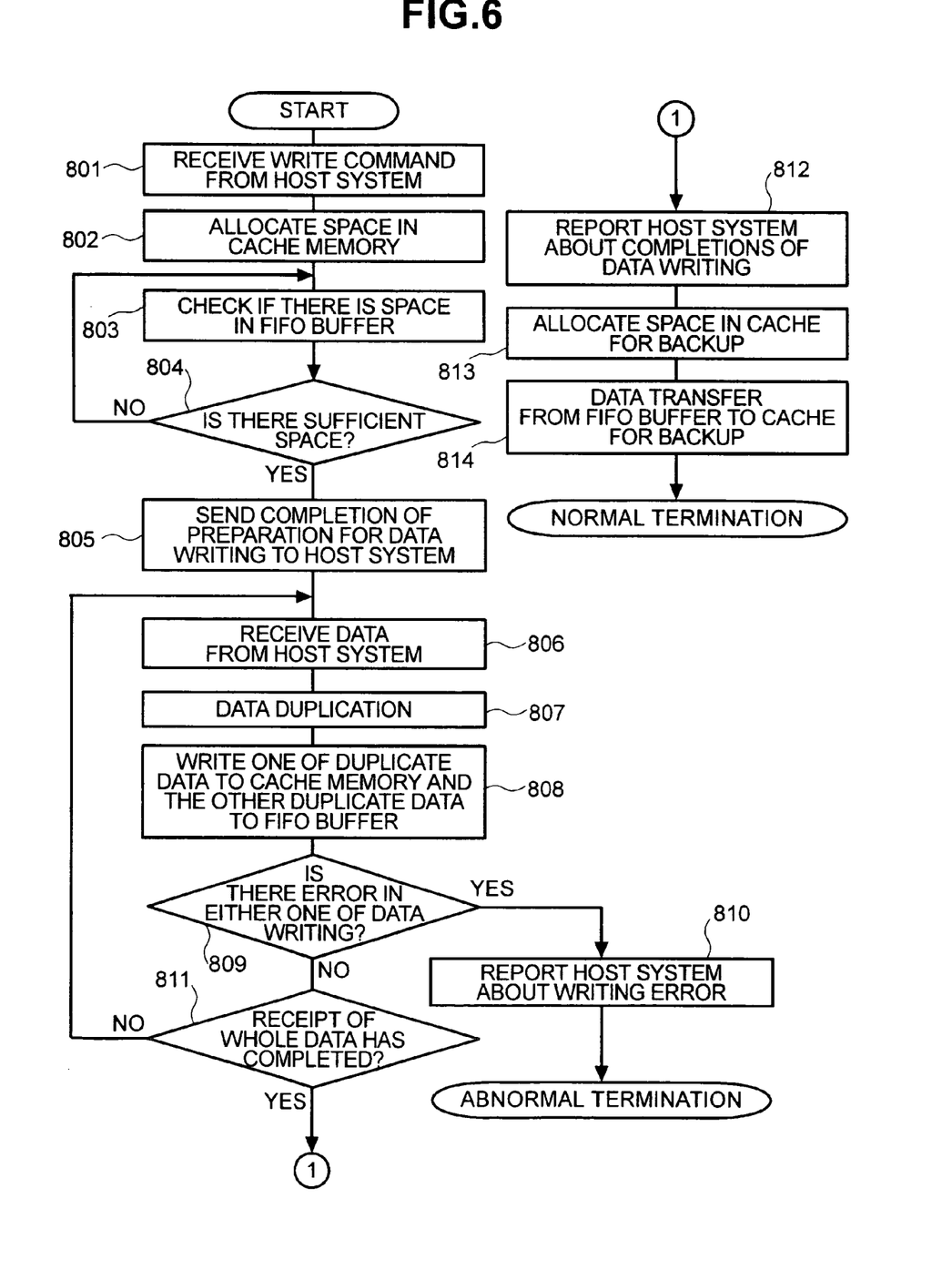
FIG. 6 shows one embodiment of a method of speeding up writing data into the storage system.

FIG. 6 is a flowchart showing a process of writing data into the storage system to which the present invention is applied. The flowchart is common to the foregoing embodiments.

The controller 10a of the storage system receives a write command from the host system via the host interface unit 100 (Step 801). Then, the controller 10a allocates a space in the cache memory 101a for the size of data designated by the write command (Step 802). The controller 10a then inspects in the FIFO buffer 102a for the space (Steps 803 and 804), and, when there is no space, the controller 10a carries out the processing of Steps 803 and 804 repeatedly until the space is created in the FIFO buffer 102a.

In the case where there is the space or the space is created, the controller 10a informs the host system about a completion of write preparation (Step 805). After that, the controller 10a receives the data from the host system (Step 806). Upon receipt of the data, the host interface unit 100a of the controller 10a duplicates the received data. Here, another unit may be used for performing the data duplication (Step 807). The host interface unit 100a then transfers one of the duplicated data to the cache memory 101a and the other duplicated data to the FIFO buffer 102a (Step 808).

Then, the controller 10a inspects whether or not an error has occurred in writing the data in the cache memory 101a and the FIFO buffer 102a (Step 809). If any error has occurred in either one of the data writings, the controller 10a informs the host system about the write error (Step 810). If no error has occurred in the data writings, the controller 10a inspects whether or not receipt of the data sent from the host system has completed (Step 811). If the receipt has not completed yet, the controller 10a repeats the processing of Steps 806 to 811 until all the data is received.

After the completion of receiving all the data, the controller 10a informs the host system about the completion of data writing (Step 812). The controller 10a instructs the controller 10b of another system (for back-up) to allocate a space in the cache memory 101b. More specifically, the FIFO buffer 102a may output a write command signal directly to the controller 10b (Step 813), for example. After the space has been allocated, the controller 10a transfers the data from the FIFO buffer 102a to the cache memory 101b for back-up, thereby terminating the process (Step 814).

With such process steps, it is possible for the storage system to inform the host system about the completion of data writing before the data is stored in the cache memory for back-up.

Figure 7:
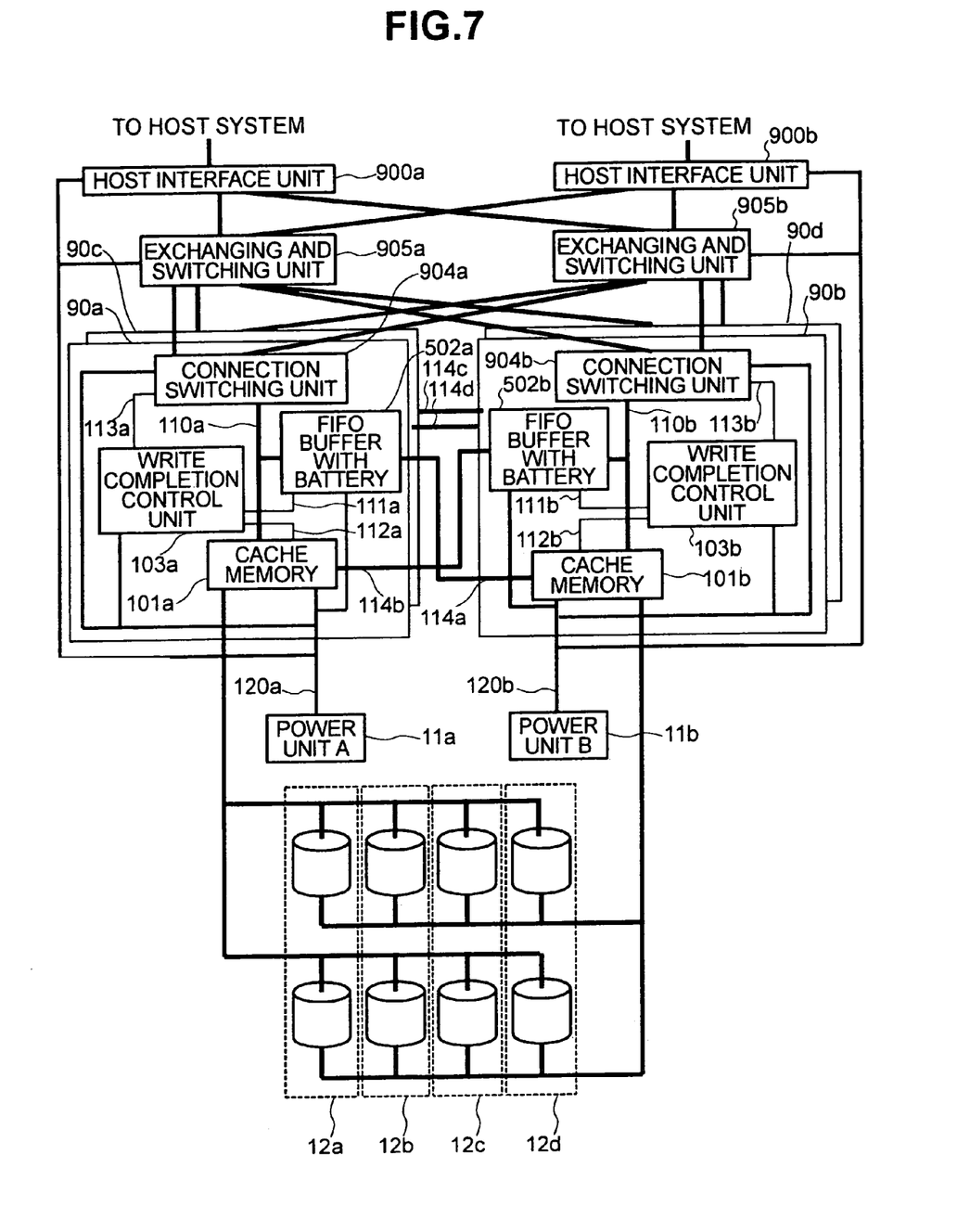
FIG. 7 shows a fourth example of the embodiments of the storage system.

FIG. 7 is a fourth embodiment of a storage system to which the present invention is applied. The storage system of this embodiment has four controllers 90a, 90b, 90c, and 90d. Among the controllers 90, the controllers 90a and 90b are of duplex system and the controllers 90c and 90d are of duplex system. That is, a power unit 11a feeds power to the controllers 90a and 90c, and the power unit 11b feeds power to the controllers 90b and 90d. The storage system of this embodiment has exchanging and switching units 905 and independent host interface units 900 in addition to the components of the storage system of the third embodiment.

Each of the controllers 90 has a connection switching unit 904 in place of the host interface unit 100 included in the controllers of the foregoing embodiments. The host interface units 900 and the connection switching units 904 of the controllers 90 are mutually connected via the exchanging and switching units 905. The host interface units 900 and the exchanging and switching units 905 may be replaced by a single host interface unit and a single exchanging and switching unit. With the above constitution, it is possible to use any one of the controllers 90a, 90b, 90c, and 90d in both of the case wherein the host system is connected to the host interface unit 900a and the case wherein the host system is connected to the host interface unit 900b.

In this embodiment, when writing data sent from the host system connected to the host interface unit 900a into the storage system, for example, the data are transferred to the connection switching unit 904a of the controller 90a via, for example, the exchanging and switching unit 905a. The data received by the connection switching unit 904a are transferred to the FIFO buffer with battery 502a and the cache memory 101a via the signal line 110a.

After completing the data writing without any failure, the FIFO buffer with battery 502a informs the write completion control unit 103a about the completion of data writing via the signal line 111a. After completing the data writing without any failure, the cache memory 101 informs the write completion control unit 103a about the completion of data writing via the signal line 112a. After being informed of the completions of data writing via the signal lines 111a and 112a, the write completion control unit 103a informs the connection switching unit 904a about the completions of data writing via the signal line 113a. The connection switching unit 904a informs the host system about the completions of data writing via the exchanging and switching unit 905a and the host interface unit 900a. Since no communication takes place between the controller 90a and other controllers 90b, 90c, and 90d for informing the data transfer, it is possible to speed up the writing process in the storage system from the standpoint of the host system.

The data stored in the FIFO buffer 502a are transferred to the cache memory 101b of the controller 90b via the signal line 114a after the host interface unit 900a has informed the host system about the completions of data writing. Thus, the communication between the controller 90a and the controller 90b is performed after the report of the completions of data writing to the host system. Further, since the data stored in the FIFO buffer with battery 502a are transferred to the cache memory 101b, it is possible to clear the FIFO buffer with battery 502a for writing data subsequently sent from the host system. Therefore, a situation wherein the subsequent data from the host system is not written until the completions of data writing on the disk drives 12 due to a lack of capacity in the FIFO buffer with battery 502a does not occur. Thus, it is possible to enhance the performance of writing process in the storage system.

The operation of the FIFO buffers with batteries 502 of this embodiment is the same as that of the FIFO buffers with batteries 502 of the third embodiment.

According to the present invention, it is possible to reduce time required for data writing in the storage system having the duplex cache memory from the standpoint of the host system. Thus, it is possible to improve data writing performance from the standpoint of the host system.

I claim:

1. A storage system comprising:
   a storage device;
   a first controller and a second controller both connected to the storage device and a host system,
   a first power unit; and
   a second power unit,
   wherein the first controller has a first memory, said first memory being a cache memory and a second memory,
   wherein, the second controller has a third memory, said third memory being a cache memory that receives a copy of the data received by said first memory,
   wherein, in the case where the first controller receives data from the host system, the first controller stores the data in the first and the second memories and sends a response to the host system, and then the first controller transfers the data stored in the second memory to the third memory,
   wherein the first memory of the first controller receives power feeding from the first power unit,
   wherein the second memory of the first controller and the third memory of the second controller receive power feeding from the second power unit.

2. A storage system according to claim 1, wherein the second memory is a FIFO buffer.

3. A storage system according to claim 2, wherein the storage device is a plurality of storage devices.

4. A storage system according to claim 3, wherein the second memory has a unit for indicating presence or absence of data stored in the second memory.

5. A storage system comprising:
   a storage device;
   a first controller and a second controller both connected to the storage device and a host system,
   a first power unit,
   a second power unit; and
   a third power unit,
   wherein the first controller has a first memory, said first memory being a cache memory and a second memory,
   wherein the second controller has a third memory, said third memory being a cache memory that receives a copy of the data received by said first memory,
   wherein, in the case where the first controller receives data from the host system, the first controller stores the data in the first and the second memories and sends a response to the host system, and then the first controller transfers the data stored in the second memory to the third memory,
   wherein the first memory of the first controller receives power feeding from the first power unit,
   wherein the second memory of the first controller receives power feeding from the second power unit,
   wherein the third memory of the second controller receives power feeding from the third power unit.

6. A storage system comprising:
   a storage device;
   a first controller and a second controller both connected to the storage device and a host system; and
   a power unit,
   wherein the first controller has a first memory, said first memory being a cache memory and a second memory,
   wherein the second controller has a third memory, said third memory being a cache memory that receives a copy of the data received by said first memory,
   wherein, in the case where the first controller receives data from the host system, the first controller stores the data in the first and the second memories and sends a response to the host system, and then the first controller transfers the data stored in the second memory to the third memory,
   wherein the first memory of the first controller and the second memory of the first controller receive power feeding from the power unit,
   wherein the second memory of the first controller includes a battery and charges the battery by the use of the power unit.

7. A storage system according to claim 6,
   wherein, in the case where a failure occurs in the power unit, the second memory switches the power feeding from the power unit to power feeding from the battery.

8. A storage system comprising:
   a host interface unit connected to a host system;
   a switching unit connected to the host interface unit;
   a first and a second controller connected to the switching unit; and
   a storage device connected to the first and the second controller,
   wherein the first controller has a first memory, said first memory being a cache memory, and a second memory,
   wherein the second controller has a third memory, said third memory being a cache memory that receives a copy of data received by said first memory,
   wherein, in the case where the first controller receives data from the host system, the first controller stores the data in the first memory and the second memory and sends a response to the host system, and then the first controller transfers the data stored in the second memory to the third memory.

9. A storage system comprising:
   a disk drive;
   a first cache memory for temporarily storing data sent from a host system so as to be written on the disk drive;

a second cache memory for storing a duplicate of the data to be written on the disk drive;
a FIFO buffer for temporarily storing the duplicate of the data sent from the host system to transfer the duplicate of the data to the second cache memory,
a first power unit connected to the first cache memory; and
a second power unit connected to the second cache memory, the second power unit being independent from the first power unit,
wherein, at the time when the data sent from the host system are stored in the first cache memory and the duplicate of the data sent from the host system are stored in the FIFO buffer, the host system is informed about the completions of data writing,
wherein the FIFO buffer is connected to the second power unit.

10. A storage system according to claim 9, further comprising a data remaining indicator for indicating whether or not all the duplicate of the data sent from the host system has been transferred from the FIFO buffer to the second cache memory.

11. A storage system comprising:
a disk drive;
a first cache memory for temporarily storing data sent from a host system so as to be written on the disk drive;
a second cache memory for storing a duplicate of the data to be written on the disk drive;
a FIFO buffer for temporarily storing the duplicate of the data sent from the host system to transfer the duplicate of the data to the second cache memory,
a first power unit connected to the first cache memory;
a second power unit connected to the second cache memory, the second power unit being independent from the first power unit; and
a third power unit connected to the FIFO buffer, the third power unit being independent from the first power unit,
wherein, at the time when the data sent from the host system are stored in the first cache memory and the duplicate of the data sent from the host system are stored in the FIFO buffer, the host system is informed about the completions of data writing.

12. A storage system comprising:
a disk drive;
a first cache memory for temporarily storing data sent from a host system so as to be written on the disk drive;
a second cache memory for storing a duplicate of the data to be written on the disk drive;
a FIFO buffer for temporarily storing the duplicate of the data sent from the host system to transfer the duplicate of the data to the second cache memory,
a first power unit connected to the first cache memory; and
a second power unit connected to the second cache memory, the second power unit being independent from the first power unit,
wherein, at the time when the data sent from the host system are stored in the first cache memory and the duplicate of the data sent from the host system are stored in the FIFO buffer, the host system is informed about the completions of data writing,
wherein the FIFO buffer is connected to the first power unit and provided with a battery for feeding power to the FIFO buffer in place of the first power unit in case of failure in the first power unit.

* * * * *